United States Patent [19]

Wible

[11] 4,362,351

[45] Dec. 7, 1982

[54] TERMINAL ASSEMBLY

[75] Inventor: John E. Wible, Painesville, Ohio

[73] Assignee: Towmotor Corporation, Mentor, Ohio

[21] Appl. No.: 232,089

[22] Filed: Feb. 6, 1981

[51] Int. Cl.³ .......................................... H01R 9/16
[52] U.S. Cl. ............................ 339/214 R; 339/263 R
[58] Field of Search ........... 339/214 R, 214 C, 214 S, 339/215 R, 215 S, 217 R, 263 R, 263 L

[56] References Cited

U.S. PATENT DOCUMENTS

| | | | |
|---|---|---|---|
| 2,269,241 | 1/1942 | Ayers | 339/214 R |
| 2,716,895 | 9/1955 | Antonidis . | |
| 2,823,251 | 2/1958 | Clark | 339/214 R X |
| 3,394,340 | 7/1968 | Kobryner | 339/217 R |
| 3,670,092 | 6/1972 | Updyke et al. | 174/152 R |
| 3,766,442 | 10/1973 | Pearce et al. | 339/214 C X |
| 3,773,132 | 11/1973 | Gawlik et al. | 180/64 R |
| 3,850,501 | 11/1974 | Butterfield et al. | 339/215 R X |

Primary Examiner—Howard N. Goldberg
Attorney, Agent, or Firm—Phillips, Moore, Weissenberger, Lempio & Majestic

[57] ABSTRACT

Electrical terminal assemblies for providing a conductive path through a wall of a motor housing frequently work loose making connection and disconnection of lead wires difficult and resulting in poor electrical contact between the terminal and the leads. The present invention overcomes these problems by providing a terminal assembly (10) including a terminal (12) extending through a motor housing (16) and secured thereto in a manner such that terminal (12) can not work loose or rotate in the housing.

12 Claims, 3 Drawing Figures

U.S. Patent  Dec. 7, 1982  4,362,351
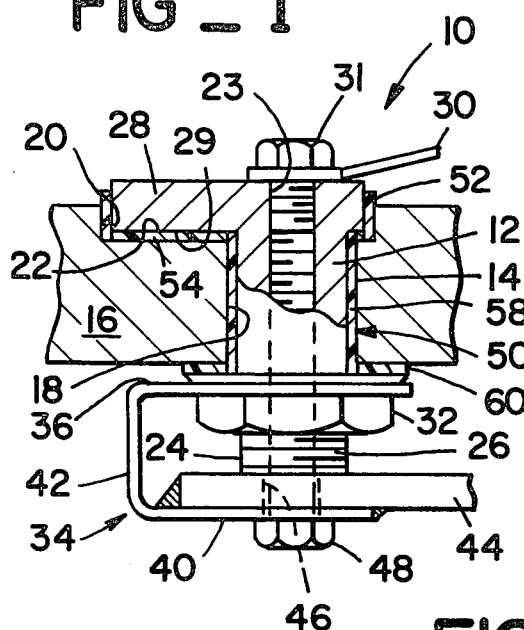
FIG_1
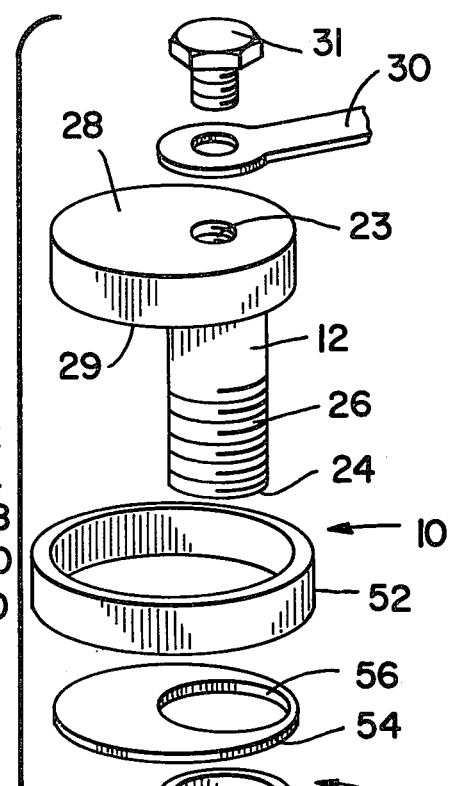
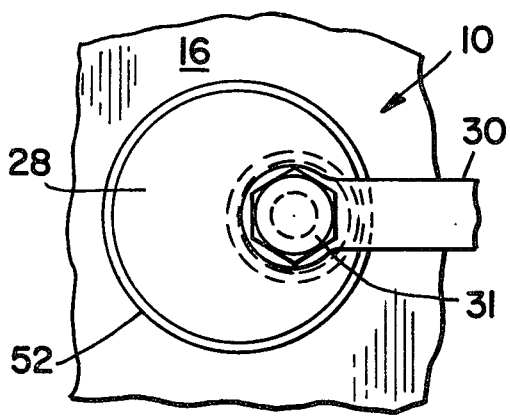
FIG_2
FIG_3
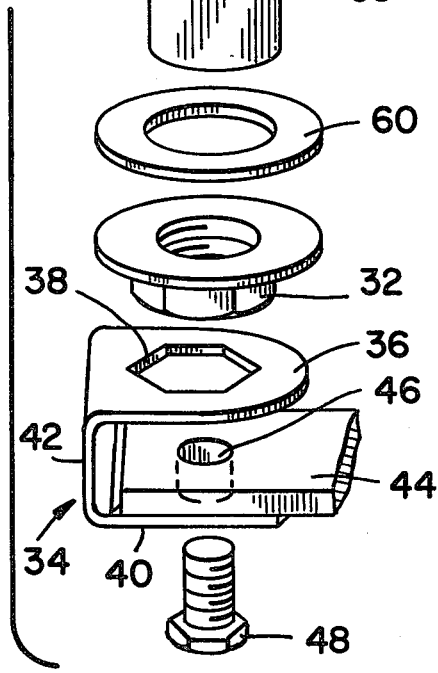

TERMINAL ASSEMBLY

DESCRIPTION

1. Technical Field

This invention relates generally to electrical terminal assemblies and more particularly to a terminal assembly for a motor.

2. Background Art

Electrical devices such as electric motors commonly include electrical terminal assemblies for providing a conductive path through the motor housing to connect the armature and field windings of the motor to an external source of electrical power. Typically, electrical terminal assemblies include an elongate terminal or stud assembly extending through an opening in the housing wall. The terminal is electrically isolated from the housing by nonconductive insulating material positioned between the terminal and the housing wall. In general, the ends of the terminals are threaded, and electrical conductors, for example leads or straps, are secured thereto by suitable fasteners such as threaded nuts, which also serve to secure the terminal assembly to the housing. Exemplary teachings of this kind are disclosed in U.S. Pat. Nos. 2,716,895, issued to J. E. Antonidis on Sept. 6, 1955; 3,670,092, issued to K. W. Updike et al on June 13, 1972; and 3,773,132, issued to E. F. Gawlik et al on Nov. 20, 1973.

While such terminals have gained wide acceptance, they are subject to certain problems. For example, it is frequently difficult to install and assemble terminals of this construction, because the end of the terminal extending into the housing may be inaccessable from the exterior. Hence, the terminal may be free to rotate in the housing wall, thereby making it difficult to thread a fastener onto the exposed terminal end, and may further cause damage or breakage of the electrical straps and wires. More specifically, in installing an electrical conductor to the motor at assembly, it is necessary to apply torque to the fastener to secure it to the terminal. Assembly problems arise if the terminal is free to turn in the housing while the fastener is being torqued. Secondly, prior art terminal assemblies frequently "work lose" due to relaxation of the nonmetallic insulator elements separating the terminal assembly from the housing, which, in turn, loosens the conductive path connections and causes poor electrical contact between the leads and the terminal. In addition, in operation, vibrations from the motor often loosen the fasteners allowing both axial and rotational movement of the terminal in the opening in the housing wall making connection and disconnection of the leads difficult and causing further deterioration in electrical conductivity between the leads and the terminal. If left untightened over an extended period of time, the fasteners often will work themselves completely off the terminal, and the leads will become disconnected, thereby rendering the motor inoperable. Furthermore, the motor may be severely damaged should, for example, a loosened nut fall into the rotating portions thereof.

The foregoing illustrates limitations of the known prior art. Thus, it is apparent that it would be advantageous to provide an alternative to the prior art.

DISCLOSURE OF THE INVENTION

In one aspect of the present invention this is accomplished by providing a terminal assembly forming a conductive path through a housing and including a terminal having a first end portion and a second end portion which is eccentric relative to the first end portion and which defines a stepped surface therebetween. The terminal is disposed in a stepped bore defined in the housing by a first cylindrical surface, a second cylindrical surface which is eccentric relative to the first cylindrical surface, and a stepped surface disposed therebetween. The terminal is secured in the stepped bore with the stepped surface of the terminal in a preselected position of support in relation to the stepped surface of the bore, thus preventing rotation of the terminal.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is a diagrammatic partial side sectional view of a terminal assembly embodying the present invention having portions drawn in elevation;

FIG. 2 is a diagrammatic top plan view of the terminal assembly of FIG. 1; and

FIG. 3 is an exploded isometric view of the terminal assembly embodying the present invention.

BEST MODE FOR CARRYING OUT THE INVENTION

Referring now to the drawings, a terminal assembly constructed in accordance with the present invention is designated generally by the numeral 10. The terminal assembly includes a generally elongate terminal 12 received in a stepped bore 14 defined in a motor housing 16 by a first cylindrical surface 18, a second cylindrical surface 20 which is eccentric relative to the first cylindrical surface, and a stepped surface 22 formed intermediate the first and the second cylindrical surfaces. The terminal 12 has a threaded bore 23 formed therein and extending the length thereof. The terminal has a first cylindrical end portion 24 having threads 26 formed thereon and extending from the housing 16 and a second end portion 28 located on the interior of the housing. The second end portion is eccentric relative to the first end portion and defines a stepped surface 29 positioned intermediate the first and second end portions of the terminal. In the embodiment shown, the second end portion 28 is formed integrally with the terminal 12 and is of a generally cylindrical configuration; but it is to be understood that other configurations may be employed without departing from the scope of the present invention. An electrical conductor or spade lug 30 is secured to the second end portion 28 of the terminal by suitable fastening means, for example a bolt 31 which is threaded into the bore 23.

The terminal 12 is secured to the motor housing 16 by a suitable fastener, for example a threaded hexagonal flanged nut 32 which is threadably received on the first end portion 24 of the terminal. A U-shaped clip 34 is secured to the second end of the terminal to lock the flanged nut in position. The clip includes a first leg 36 having a hexagonally shaped opening 38 formed therein which is dimensioned to receive the nut in a close fitting relationship. The clip further includes a second leg 40 connected to the first leg by an intermediate or bight portion 42. The second leg has an electrical conductor or strap 44 secured thereto, for example by welding. An opening or bore 46 extends through the strap and the second leg of the clip and is in coaxial alignment with the threaded bore 23 in the terminal. With the nut received in the hexagonally shaped hole in the first leg, the clip is secured to the first end of the terminal by a bolt 48 extending through the opening 46 in the second leg and the strap and threaded into the bore 23.

The terminal assembly 10 also includes an insulator illustrated generally by the numeral 50 for electrically isolating the assembly from the motor housing 16. The insulator is formed from any suitable insulating material such as rubber, plastic, or a ceramic and includes an annular ring 52 extending circumferentially around the eccentric second end portion 28 of the terminal and disposed intermediate the second end portion and the second cylindrical surface 20 of the stepped bore 14. A first insulating washer 54 is positioned intermediate the stepped surface 29 of the terminal 12 and the stepped surface 22 of the stepped bore. The insulating washer has an offset opening 56 formed therein for receiving the first end portion 24 of the terminal. The insulator further includes a collar 58 positioned in the stepped bore 14 and encasing the terminal and a second insulating washer 60 received over the first end portion 24 of the terminal and positioned intermediate the motor housing 16 and the clip 34.

INDUSTRIAL APPLICABILITY

With the parts assembled as set forth above, the terminal assembly of the present invention has application wherever it is desirous to provide an electrically conductive path through a wall. One such application is to provide a conductive path through the housing of a motor.

Typically, electrical terminal assemblies employ one or more cooperating nuts to simultaneously secure the assembly to a supporting member, for example a housing, and to secure electrical leads or conductors to the terminal. Before the nuts are tightened down, the terminal is freely rotatable in the housing which makes both connection and disconnection of the leads difficult. Furthermore, relaxation of the nonmetallic insulators separating the terminal and the housing and normal vibrations resulting from operation of the motor frequently result in loosening of the nuts, which allows rotation of the terminal about its longitudinal axis and causes the electrical connections to work loose.

The aforementioned problems are overcome by the novel construction of the terminal assembly 10 of the present invention. The eccentric second end portion 28 of the terminal 12 is received in the portion of the stepped bore 14 defined by the eccentric second cylindrical surface 20 and the stepped surface 22 and cooperates therewith in preventing rotation of the terminal in the stepped bore. Therefore, the adjustable hexagonal flanged nut 32 may be threaded onto the first end portion 24 without imparting rotation to the terminal. As the nut is tightened down, the terminal is translated longitudinally in the stepped bore, thus urging the stepped surface 29 of the terminal into a preselected position of support adjacent the insulating washer 54 and in relation to the stepped surface of the bore. Thereafter, the electrical conductor or spade lug 30, the clip 34, and the electrical conductor or strap 44 may be easily connected to or disconnected from the terminal assembly 10 without imparting rotation to the terminal.

In addition to the foregoing, the hexagonal flanged nut 32 received in the mating hexagonal opening 38 in the clip 34 is engaged by the first clip leg 36 and prevented from working loose due to vibrations caused by operation of the motor. Moreover, the conductor 44, which for example may be a main motor or battery strap, is secured to the second leg 40 of the clip by welding or other suitable securance means so that it is not free to rotate, thus insuring positive electrical contact between the strap and the terminal.

While the present invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiments disclosed, but that the invention will include all embodiments falling within the scope of the appended claims.

I claim:

1. A terminal assembly (10) for providing a conductive path through a housing (16) comprising:
   a terminal (12) having first (24) and second (28) end portions, the second end portion (28) being eccentric relative to the first end portion (24) and defining a stepped surface (29) therebetween;
   a stepped bore (14) defined in the housing (16) by first (18) and second (20) cylindrical surfaces and a stepped surface (22) therebetween, the second cylindrical surface (20) being eccentric relative to the first cylindrical surface (18);
   means (26, 32) for securing the terminal (12) in the stepped bore (14), the securing means (26, 32) being adjustable to longitudinally translate the terminal (12) in the stepped bore (14) and to urge the stepped surface (29) of the terminal (12) into a preselected position of support in relation to the stepped surface (22) of the bore (14); and
   means (34, 38, 48) for locking the securing means (26, 32) against movement and for maintaining the terminal (12) at the preselected position of support.

2. The terminal assembly (10) of claim 1 wherein the securing means (26, 32) includes:
   threads (26) formed on the first end portion (24) of the terminal (12), and
   fastening means (32) threaded onto the first end portion (24) of the terminal (12).

3. The terminal assembly (10) of claim 2 wherein the fastening means (32) is a threaded flanged nut (32).

4. The terminal assembly (10) of claim 3 wherein the locking means (34, 38, 48) includes a clip (34), including:
   a first leg (36) having an opening (38) in which the hexagonal flanged nut (32) is lockingly received; and
   a second leg (40) secured to the first end portion (24) of the terminal (12).

5. The terminal assembly (10) of claim 4 wherein the clip (34) includes an electrical conductor (44) secured to the second leg (40).

6. The terminal assembly (10) of claim 5 further including insulating means (50) for electrically isolating the terminal (12) from the housing (16).

7. In a motor having a housing (16) and a terminal assembly (10) for providing a conductive path through a housing (16) the improvement comprising:

a terminal (12) having first (24) and second (28) end portions, the second end portion (28) being eccentric relative to the first end portion (24) and defining a stepped surface (29) therebetween;

a stepped bore (14) defined in the housing (16) by first (18) and second (20) cylindrical surfaces and a stepped surface (22) therebetween the second cylindrical surface (20) being eccentric relative to the first cylindrical surface (18);

means (26, 32) for securing the terminal (12) in the stepped bore (14), the securing means (26, 32) being adjustable to longitudinally translate the terminal (12) in the stepped bore (14) and to urge the stepped surface (29) of the terminal (12) into a preselected position of support in relation to the stepped surface (22) of the bore (14); and means (34, 38, 48) for locking the securing means (26, 32) against movement and for maintaining the terminal (12) at the preselected position of support.

8. The motor of claim 7 wherein the securing means (26, 32) includes:

threads (26) formed on the first end portion (24) of the terminal (12); and fastening means (32) threaded onto the first end portion (24) of the terminal (12).

9. The motor of claim 8 wherein the fastening means (32) is a threaded flanged nut (32).

10. The motor of claim 9 wherein the locking means (34, 38, 48) includes a clip (34), including:

a first leg (36) having an opening (38) in which the hexagonal flanged nut (32) is lockingly received; and a second leg (40) secured to the first end portion (24) of the terminal (12).

11. The motor of claim 10 wherein the clip (34) includes an electrical conductor (44) secured to the second leg (40).

12. The motor of claim 10 further including insulating means (50) for electrically isolating the terminal (12) from the housing (16).

* * * * *